United States Patent

Kleptz et al.

[15] 3,697,992

[45] Oct. 10, 1972

[54] SERVO COMPENSATION FOR INERTIA CHANGE

[72] Inventors: James A. Kleptz; George H. Bissell, both of Dalton, Mass.

[73] Assignee: The United States of America as represented by the Secretary of the Navy

[22] Filed: July 9, 1970

[21] Appl. No.: 53,361

[52] U.S. Cl. ............................... 343/7 ED, 343/7.4
[51] Int. Cl. ............................................. G01s 9/02
[58] Field of Search ................... 343/7 ED, 7 A, 7.4

[56] References Cited

UNITED STATES PATENTS

| | | |
|---|---|---|
| 3,293,643 | 12/1966 | Blomquist ................... 343/7.4 |
| 2,968,997 | 1/1961 | Newton, Jr. et al. ..... 343/7 ED |
| 3,034,116 | 5/1962 | Shelley ..................... 343/7 ED |
| 3,146,443 | 8/1964 | Blackburn ................ 343/7 ED |

Primary Examiner—Benjamin A. Borchelt
Assistant Examiner—G. E. Montone
Attorney—R. S. Sciascia and Thomas O. Watson, Jr.

[57] ABSTRACT

An improvement in the servo drive system as used in a missile director during the elevation function to compensate for changes in inertia. The secant potentiometer and its associated circuitry is amended to compensate for inertia change as well as changes in elevation angle.

6 Claims, 4 Drawing Figures

SERVO COMPENSATION FOR INERTIA CHANGE

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The present invention relates to control systems for missile directors and more particularly to control systems which are compensated for inertia changes during the elevation function.

In conventional control systems, such as the type that would be used in positioning directors for missiles, the high inertial load is stabilized in inertial space through a closed loop feed back system wherein disturbance motions applied to the load are counteracted by servo drive motors connected thereto. A reversible DC motor serves as the prime mover for the inertial load and is supplied with electrical voltage of a polarity and magnitude which is dependent upon an error signal developed by comparison of a position input signal and a position feedback signal in a servo amplifier. Separate error signals are generally derived along the principal spacial axis of the moveable platform with one or more of these sensing means for detecting motion in space being directly connected to the platform in the conventional systems. The early control systems had the platform connected to the servo motor through speed reduction means which was generally a reduction gear train delivering the needed torque response. The mechanical power was delivered from a conventional high speed motor geared down to a speed ratio range from 300 to 1 to 1,000 to 1 which introduced many undesirable factors to high performance servo control, including added inertia sometimes larger than the platform load, a source of backlash, spring and friction, as well as mechanical resonance in the gear train.

The director plays a basic roll in the overall fire control system for a missile and operation of this director is accomplished by a power drive servo (train/elevation) the fire control tracking loop. The servo receives rate orders, and by summing with gyro generated rate responses, developes rate errors. The signal errors, when amplified and modified, are used to control the power amplifier, which in turn controls magnitude and polarity of torque motor current.

Direct drive DC torque motors are integrated directly into the director structure. In the case of the train motor, the rotor is part of the rotating structure and the stator yolk is the major portion of the main load supporting base. The elevation motor on the other hand, has the elevation structure splined and bolted to the rotor while the stator is attached to the upper platform, and provides mounting for the elevation buffer stops. The director, as used herein, is a two axis tracker designed for shipboard use, and has drive capabilities of rotational motion about its train axis, and about its elevation axis.

Both train and elevation gyros are "Type 1" power drive servo employing rate gyros as primary feedback elements, SCR power amplifier power stages, and direct drive, permanent magnetic field, DC motors. The elevation gyros sense rate about the elevation axis while the traverse gyro, sensing rate about the traverse axis, supplies train rate information by a secant function potentiometer since: train rate equals traverse rate times secant ($E_d'$).

Each servo employs, in addition to velocity feedback (gyro), differentiated velocity (acceleration - diffgyro) feedback, and motor current feedback. The basic design is mechanized such that servo stabilization is provided by velocity feedback in the low frequency region, and current feedback in the high frequency region (frequencies greater than open loop unity gain crossover). Diffgyro signals contribute to feedback stabilization for the frequency region between velocity feedback stabilization and current feedback stabilization, serving to improve open loop phase shift (and thus lower close loop peak gain) for rate order input. This design enables the director to operate with high open loop gain at ships roll and pitch frequencies (to minimize errors due to disturbances), while being attenuated at director structural resonant frequencies. The train servo requires knotch filters to further attenuate director structural resonancies as sensed by the traverse gyro.

A shipboard director is space rate stabilized and as such it must compensate for ships motion. The director has high internal loop gain from DC to 1.05 radians per second (ships frequency bandwidth). This produces accurate compensation for ships motion. The director is primarily a tracking director which is used in a radar track loop. The nominal value of the bandwidth of the track loop (position loop) is DC to 3 radians per second. For some tracking operations, the tracking loop is sensitive to director response amplitude and phase, out to 20 radians per second; it is therefore necessary to specify director amplitude ratio and phase shift at 20 radians per second as a value not to be exceeded for track loop stability consideration.

The search pattern (rates, frequency, and so forth) determined by the system design is optimized for minimum action time within the capability of the equipment. Equipment capability includes rate and acceleration capabilities of the director and bandwidth of the director. An approximation of the search pattern has a fundamental of 3.14 radians per second with harmonic components at 6.28 radians per second and 9.42 radians per second. Since the above values define director output rates, orders to the director must be adjusted to compensate for variations in the director's amplitude and phase response at the frequencies under consideration.

An important object to be considered in the operation of a director is the tolerance band of the frequency response (amplitude and phase) of both power drive servos (train and elevation). Director response tolerance bands may be generated by: tolerance at a selected frequency equals the square root of the sum of the squares of the response deviation from the nominal at that frequency due to each case. Or tolerance at a selected frequency equals RSS. Final tolerance bands considered factors that were not random and whose affect had to be added algebraically to the random tolerance. Such factors were antenna train inertia variance with elevation angle, and uncertainty in determining a nominal antenna inertia. The tolerance band at a given frequency is largely made up of random variables. If all variables considered were truly random with no correlation between amplitude and phase, the probability of having the maximum amplitude ratio with maximum phase lag is extremely high. Since all variables considered are not random and there is some correlation beyond 20 radians per second between maximum amplitude and a minimum phase lag a more reasonable interpretation for frequencies beyond 20 radians per second would be to take maximum amplitude ratio with the nominal value of the phase lag or maximum phase lag with the nominal value of amplitude ratio.

SUMMARY OF THE INVENTION

Since the operation of a missile director depends to a great extent upon the tolerance band at which the director functions, and it is desirable that this frequency tolerance band be reduced, such reduction is of keynote importance. One of the methods of obtaining this improvement or reduction of the tolerance band is to compensate the train servo loop to take care of train inertia changes with elevation angle, and this function could be incorporated in the present secant potentiometer through redesign. Such a redesign would result in a 75 percent reduction in the tolerance band because exact compensation is not realizable.

OBJECTS OF THE INVENTION

An object of the present invention is the provision of a servo drive system for missile directors.

Another object is the provision of a servo compensation for inertia change.

Still another object is the provision of a constant loop gain for a servo system whose inertia changes as a function of angle.

Yet another object of the present invention is the provision of a servo drive mechanism in which the secant function and compensation for inertia change with elevation angle are combined into one device.

Yet another object of the present invention is the provision of a servo drive circuit in which the secant function and the inertia change with elevation angle function are combined mathmatically into a single potentiometer.

Another object of the present invention is the provision of a servo drive for a missile director which makes the director more stable and reduces the magnitude of errors by the reduction of the tolerance band through compensation for inertia change with elevation angle.

Other objects in many of the attended advantage of this invention will be readily appreciated as the same becomes better understood by reference to the following detailed description when considered in connection with the accompanying drawings in which like reference numerials designate like parts throughout the figures thereof and wherein.

DESCRIPTION OF THE PREFERRED EMBODIMENTS

Figure 1:
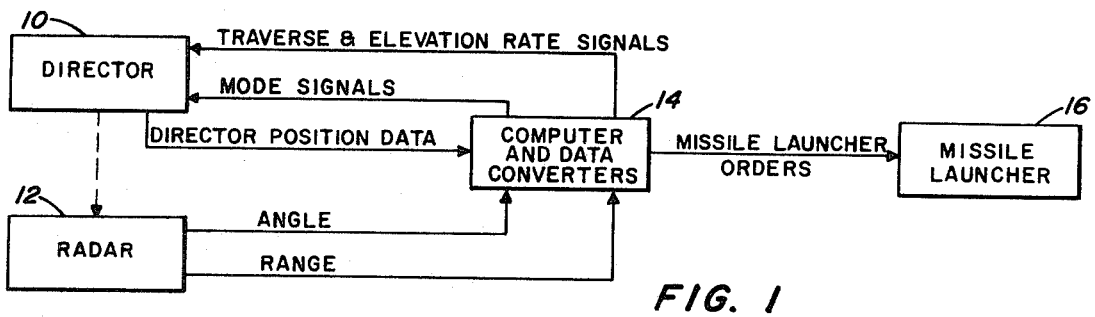
FIG. 1 shows a block diagram of an overall fire control system.

Referring now to the drawings there is seen in FIG. 1 the basic role a director plays in an overall fire control system. A director 10 orders and controls the operation of a search radar 12, radar 12 producing two outputs, one for angle and one for range which is applied to a computer and data converter 14. Two of the outputs from computer 14 such as mode signals and traverse and elevation rate signals are applied back to the director 10. The director in turn applies a director position data output which is applied as another input to computer 14, this information being processed and being sent as missile launcher orders to a launcher 16.

Figure 2:
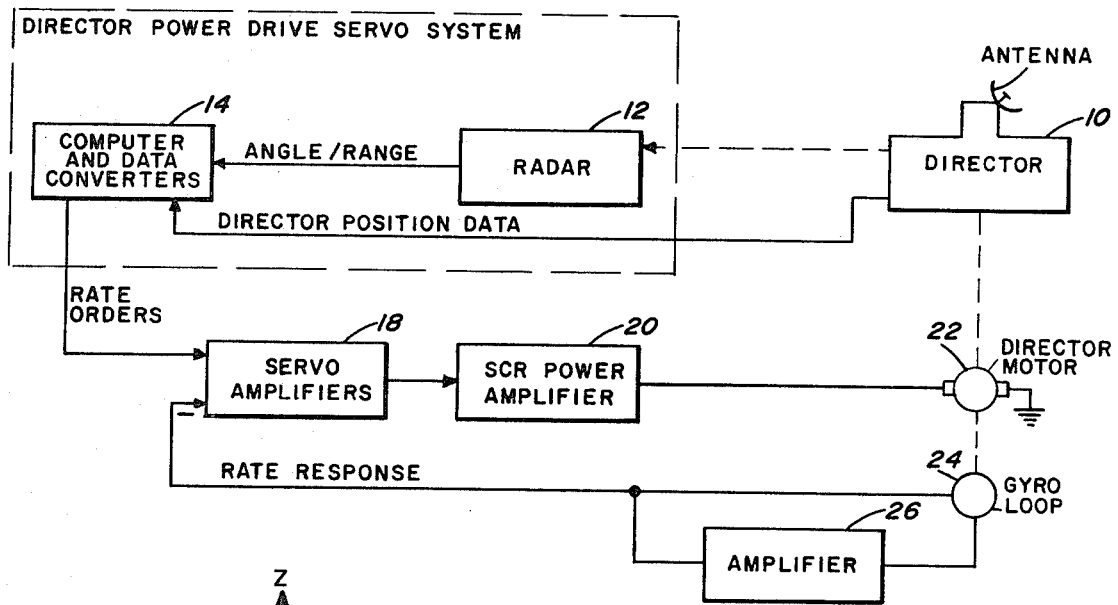
FIG. 2 illustrates a director power drive servo (train/elevation) in a fire control tracking loop.

In FIG. 2, which illustrates a director power drive servo in a fire control tracking loop, there is shown a director 10 which produces one output to a radar 12 and another output in the form of director position data to the computer 14, the computer also receiving data as to angle and range from radar 12. The output from computer 14, in the form of rate orders, is applied to servo amplifiers 18, from whence the signal goes to SCR power amplifier 20, the output of this power amplifier in turn serving to drive the director motor 22 which controls the rotation of the director. Integrally connected to director 10 and director motor 22 there is a gyro 24 and the associated amplifier 26, these two working together to form a gyro loop and producing a rate response which is applied as an input to servo amplifiers 18.

Figure 3:
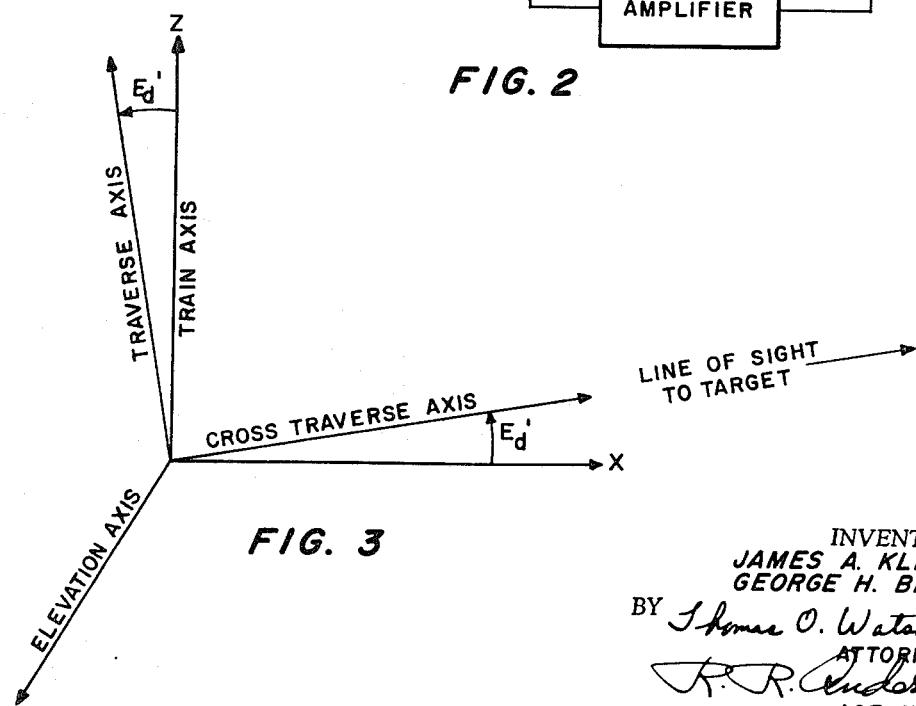
FIG. 3 shows the director coordinates for a two axis tracker having drive capabilities of rotational motion about its train axis and about its elevation axis.

FIG. 3 shows the director coordinates as leading to the location of the target, and it will be noted that axes X, Y, and Z are mutually perpendicular to each other, while axes X and Y lie in the plane of the deck. $E_d'$ is the elevation angle of line of sight from the deck plane, and the traverse axis is perpendicular to the cross traverse axis.

Figure 4:
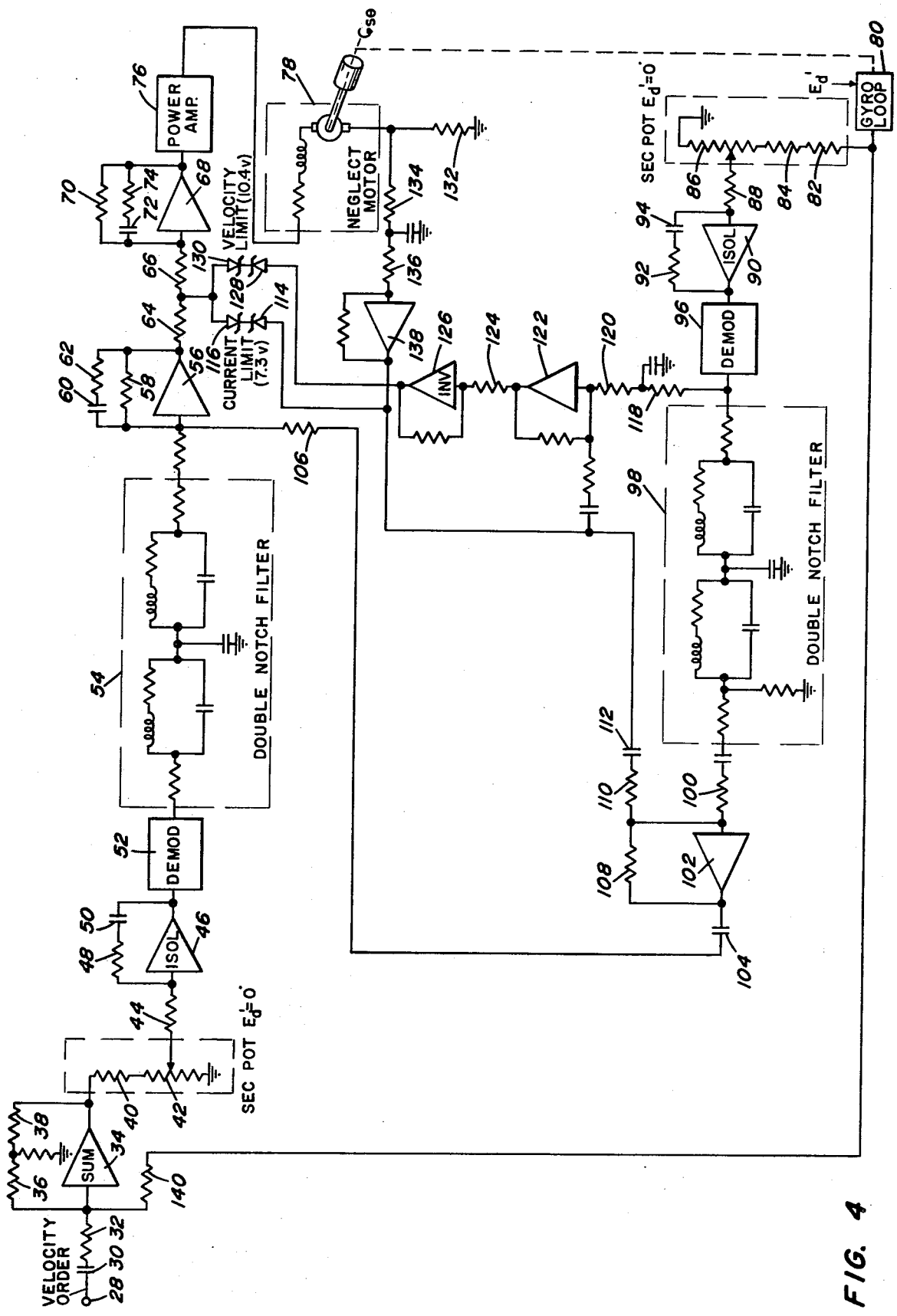
FIG. 4 shows a schematic diagram of the invention.

Analog diagrams for the train servo is given in FIG. 4 wherein the velocity order is applied as a signal to input terminal 28. From input terminal 28 the signal then passes through a capacitance 30 and a resistance 32 to a summing amplifier 34, the summing amplifier 34 having in parallel with it two series connected resistances 36 and 38. The output of summing amplifier 34 is applied to a series resistance 40 and then to one side of a secant wound potentiometer 42. The sliding arm of the potentiometer 42 is connected to a series resistance 44 which in turn is connected to a isolation amplifier 46. Connected in parallel with isolation amplifier 46 is a resistance 48 and capacitance 50. The output of isolation amplifier 46 is applied to a demodulator 52, the output of which is applied to a double notch filter 54 shown enclosed within the dotted lines.

When the signal leaves double notch filter 54 it is applied to an amplifier 56, this amplifier having connected in parallel therewith a network consisting of a resistance 58 connected in parallel with series connected capacitance 60 and resistance 62. The output of amplifier 56 is then applied to series connected resistances 64 and 66 before being applied to an amplifier 68. Amplifier 68 has a network connected in parallel with it consisting of a resistance 70 connected in parallel with series connected condenser 72 and resistance 74, the output of amplifier 68 in turn being connected to a power amplifier 76 the output of which is applied to energize director motor 78.

Integrally connected to the motor shaft of director motor 78 there is a gyro 80 which turns with and is driven by the motor. The output of gyro 80 is applied to two series connected resistances 82 and 84 before being applied to one side of a second wound potentiometer 86. The movable arm of the potentiometer 86 is connected to a series resistance 88 which in turn is connected to a isolation amplifier 90, amplifier 90 being connected in parallel with series connected resistance 92 and capacitance 94. The output signal from isolation amplifier 90 is applied to a demodulator 96 before being applied to a double notch filter 98 shown enclosed within the dotted lines. After leaving double notch filter 98 the signal passes through a series resistance 100 and then is applied as an input to an amplifier 102, after leaving amplifier 102 the signal then passes through a capacitance 104 and series connected resistance 106 before being applied as a second input to amplifier 56. Connected in parallel with amplifier 102 there is a resistance 108, one end of this resistance forming a connection for a lead having resistance 110 and capacitance 112 forming a part thereof, this lead in turn going to a pair of oppositely poled zener diodes 114 and 116 the anode of zener diode 116 being connected to the junction between resistances 64 and 66. Zener diodes 114 and 116 operate in the circuit as current limiters and generally function at approximately 7.3 volts.

Connected at the junction between demodulator 96 and double notch filter 98 there is a lead containing a resistance 118, another resistance 120, an amplifier 122, a resistance 124, an inverter 126, and two zener diodes 128 and 130 connected back-to-back the anode of zener diode 130 being also connected to the junction of resistances 64 and 66. Diodes 128 and 130 operate in the circuit as a velocity limit and function in the neighborhood of 10.4 volts. Connected between the armature motor 78 and ground there is a small resistance 132 which acts as a armature current sensor for the motor.

From the upper end of resistance 132 there is a lead passing in turn through a resistance 134, another resistance 136, an amplifier 138, and terminating at the cathode of zener diode 114.

A feedback loop is established by a connection from the output of gyro 80, through a series connected resistance 140 and to the input of summing amplifier 34.

In operation it can be seen that the invention functions to reduce and thereby improve the train tolerance bands through compensation of the train servo loop to take care of train inertia changes with elevation angle. This function is incorporated into the present secant potentiometer through redesign and involves resistance for the potentiometer 42, resistances 82 and 84 as well as potentiometer 86. Thus, through the adjustment of potentiometers 42 and 86 the component of elevation angle of line of sight from the deck plane, ($E_a'$) as shown in FIG. 3 is compensated out so that ($E_2'$) is equaled to 0.

Obviously many modifications and variations of the present invention are possible in the light of the above teachings. It is therefore to be understood, that within the scope of the appended claims, the invention may be practiced otherwise than as specifically described.

What is claimed is:

1. A servo control system compensated for inertia change comprising:

a movable platform as would be used for a missile director;

a reversible motor for moving the platform;

detection means for providing a signal indicative of platform movement;

means for receiving the signals indicative of platform movement to produce rate orders;

means including a gyro for providing a signal indicative of the rate of platform movement;

a train servo for the train axis and an elevation servo for the elevation axis, both servos employing rate gyros as primary feedback elements;

a secant potentiometer so that the train rate equals the traverse rate times the secant of the elevation angle of the line of sight to a target from the deck plane;

a servo amplifier for receiving the rate orders and the signal from the rate means to derive a rate error signal by comparing the two; and a power amplifier connected to the servo amplifier for energizing the motor in accordance with the error signals.

2. The device of claim 1 wherein the detection means is a radar.

3. The device of claim 2 wherein the means for receiving signals indicative of platform movement to produce rate orders is a computer and data converter.

4. The device of claim 1 wherein the secant potentiometer has three sections, two of which perform the secant function and one performs a linear function.

5. The device of claim 4 wherein the linear function performed by the potentiometer is the train inertia compensation for changes with elevation angle.

6. The device of claim 5 wherein the train tolerance band is reduced by the use of a secant potentiometer compensated for inertia changes.

* * * * *